July 18, 1961

A. E. RINEER 2,992,616

FLUID POWER CONVERTER

Filed July 2, 1956

INVENTOR.
ARTHUR E. RINEER
BY
Dybvig and Jacox
HIS ATTORNEYS

July 18, 1961

A. E. RINEER 2,992,616

FLUID POWER CONVERTER

Filed July 2, 1956

INVENTOR.
ARTHUR E. RINEER
BY
HIS ATTORNEYS

United States Patent Office 2,992,616
Patented July 18, 1961

2,992,616
FLUID POWER CONVERTER
Arthur E. Rineer, P.O. Box 188, Centerville, Ohio
Filed July 2, 1956, Ser. No. 595,372
10 Claims. (Cl. 103—121)

This invention relates to a hydraulic or pneumatic fluid power converter device operable as a motor or pump, and more particularly to a rotary fluid power converter device employing fluid pressure responsive valve members, although not necessarily so limited.

Hydraulic power converter devices of the rotary vane type have been designed that embody a fixed cylindrical stator member provided with radially extending vanes adapted to engage an outer rotor member. The vanes operate to partition an annular opening between the rotor and stator into a plurality of chambers. Typically, the vanes are seated in radial slots in the stator and forced into engagement with the rotor element by springs or cams, or other mechanical means.

Due to the force couple created by the hydrostatic pressure of the hydraulic fluid when such a device is placed in operation, the vanes tend to pivot in their respective radial slots with a resultant tendency of the vane to bind with the margins of the slot. This effect, prevalent particularly at high operating speeds, leads to excessive wear and inefficiency of power conversion.

Other deleterious effects arise from wear of any cam elements employed to seat the vanes, and accumulated wear of the vane and rotor surfaces in which replacement costs are high.

One object of the present invention is to provide an economically manufactured fluid power converting device capable of developing high torques and operable as a motor or pump, wherein inefficiency of operation brought about through wear of parts has been substantially eliminated.

Another object of this invention is to provide a fluid power converting device of the rotary type wherein the conventional vanes are replaced by floating valve members seated by the pressure of the fluid, the device being designed for both clockwise and counterclockwise rotation.

A further object of this invention is to provide a fluid power converting device wherein the mechanical output torque is substantially in constant proportion to the input fluid pressure.

Still another object of this invention is to provide a fluid power converting device having a novel fluid inlet and outlet manifold construction allowing for simplified free wheeling and braking control.

A still further object is to provide a fluid power converter device which is operable from a pneumatic power source and which is operable as a pneumatic pump.

Other objects and advantages reside in the construction of parts, the combination thereof, the mode of operation, and the method of manufacture, as will become more apparent from the following description.

In the drawings, FIGURE 1 is a side elevational view of one embodiment of the power converter of this invention.

Figure 1:
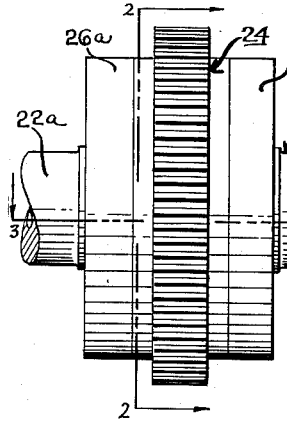
Figure 2:
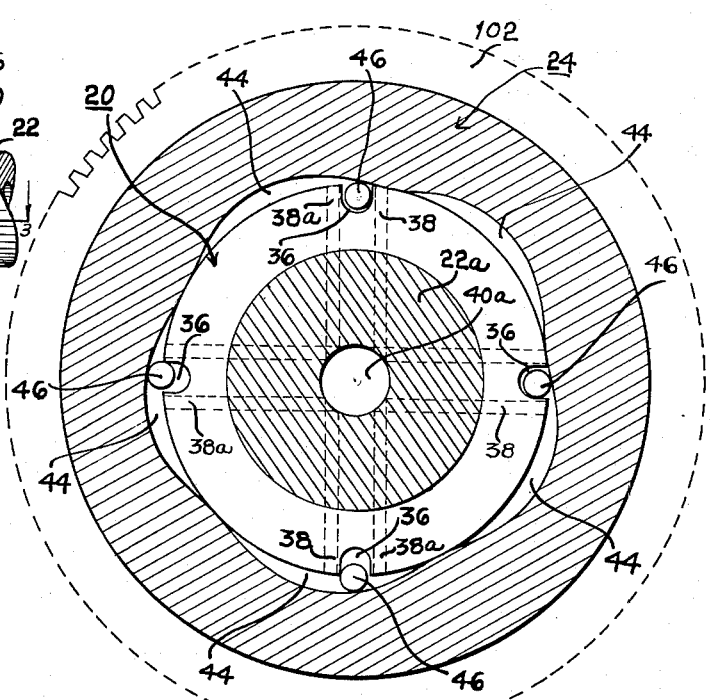
FIGURE 2 is an enlarged sectional view, taken substantially along the line 2—2 of FIGURE 1.
Figure 3:
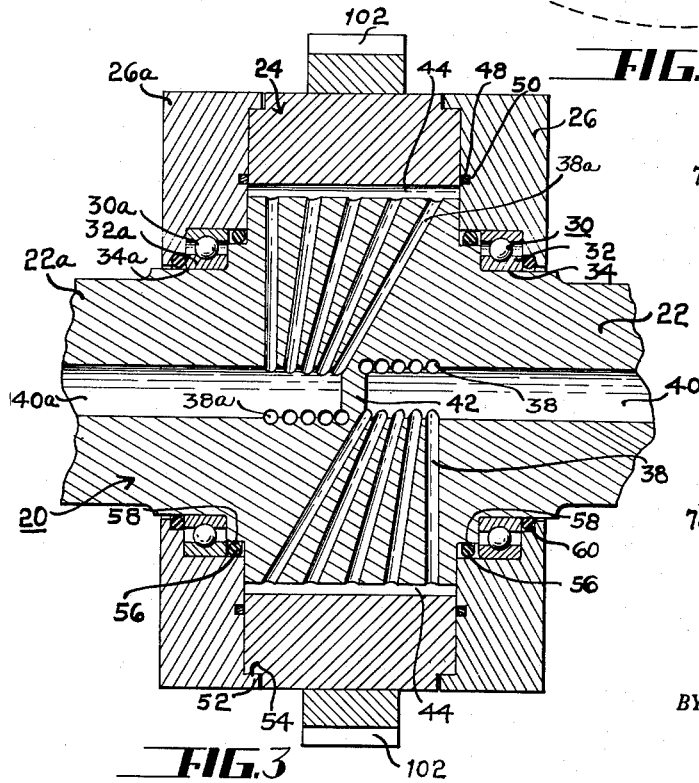
FIGURE 3 is an enlarged sectional view, taken substantially along the line 3—3 of FIGURE 1.

Referring to the drawings in detail, one embodiment of the power converter device of this invention is illustrated in FIGURES 1, 2 and 3. The reference numeral 20 refers to a stator member of substantially cylindrical shape provided with oppositely disposed axial arms 22 and 22a. The arms 22 and 22a may be fixedly mounted by any suitable means.

An annular rotor 24 encircles the central portion of the stator 20, the rotor 24 being supported by end plates 26 and 26a disposed on either side thereof. The end plates 26 and 26a are secured to the rotor 24 by any suitable means, as for example, by threaded bolts, not shown. The end plates 26 and 26a are each provided with an annular peripheral flange 52 tightly seated upon a complementary shoulder portion 54 of the rotor, the flange and shoulder portions cooperating to register the end plates 26 and 26a concentrically with the rotor.

The end plate 26 is provided with a central ball bearing ring 30 having an inner race 32 adapted to seat upon a shoulder portion 34 of the stator. Similarly, the end plate 26a opposite the end plate 26 is provided with a centrally disposed ball bearing ring 30a having an inner race 32a adapted to seat upon a shoulder portion 34a of the stator. The rotor 24 and the end plates 26 and 26a are thus mounted for rotation upon the stator 20.

The periphery of the stator 20 intermediate the end plates 26 and 26a is divided into four quadrants by four equally spaced axially extending channels 36. Adjacent each channel 36, on the clockwise side thereof as viewed in FIGURE 2, are a plurality of axially aligned passages 38 extending obliquely into the stator to communicate with a manifold 40 extending axially in the arm 22 of the stator. Similarly, adjacent each channel 36, on the counterclockwise side as viewed in FIGURE 2, are a plurality of axially aligned passages 38a extending obliquely into the stator to communicate with a manifold 40a extending axially in the arm 22a of the stator. The arrangement of the passages 38 and 38a in each quadrant of the stator is such that the spacing between the passages 38 and 38a at the periphery of the stator is substantially 72 degrees of arc.

The axially directed manifolds 40 and 40a in the stator arms 22 and 22a are separated by a solid disc element 42 located centrally in the stator 20 intermediate the arms 22 and 22a. Thus, if a fluid is introduced under pressure in the manifold 40a of the arm 22a, the fluid will flow substantially radially outwardly to the periphery of the stator in the passages 38a. Similarly, a fluid introduced under pressure in the manifold 40 in the arm 22 of the stator will flow substantially radially outwardly to the periphery of the stator through the passages 38.

To compensate for fluid pressure losses due to fluid flow resistance in the passages 38 and 38a, the diameter of these passages may increase proportionately with the length thereof in such a manner that the fluid pressure losses in each of the passages 38 or 38a is substantially constant.

The annular rotor 24 is provided with an inner cavity so contoured as to provide five axially extending chambers 44 distributed circumferentially within the annular rotor. The chambers 44 cooperate to provide in the inner wall of the rotor a continuous sine or cosine curve surface, the minima of which are contiguous with the periphery of the stator. In the illustration of FIGURE 2, there are five equally spaced chambers 44 partitioned by five equally spaced minima in the inner wall of the rotor 24 contacting the periphery of the stator. Clearly, the central angle subtended by adjacent minima is 72 degrees.

Seated within each channel 36 of the stator is a cylindrical valve or abutment 46 extending between the end plates 26 and 26a and having a diameter less than the width of the channels 36 so as to fit freely therein. The amplitude of the sine curve surface of the rotor, this being the maximum radial depth of each chamber 44, is adjusted according to the diameter of the valves 46, so as to be numerically less than one-half the value thereof. The arrangement of parts is clearly such that the valves 46 are freely movable within the channels 36, but are prevented from moving more than half way out of the channels 36 by the rotor 24, irrespective of the angular orientation of the rotor relative to the stator.

As will be described in the following, a fluid which may be a liquid or gas is introduced into the chambers 44 through the passages 38 or 38a. To prevent escape of the fluid from the chambers 44, an annular O-ring seal 48 is recessed in an annular groove 50 provided therefor in each plate 26 and 26a, the O-ring seals 48 engaging the opposite sides of the rotor 24. A flow of fluid radially outwardly between the rotor 24 and end plates 26 and 26a is thereby prevented.

O-ring seals are also provided between the end plates 26 and 26a and the arms 22 and 22a of the stator. One O-ring 56 is recessed in the inner face of each end plate, adjacent the outer race of the bearing ring therein, these O-rings being seated upon a shoulder portion 58 in each arm 22 and 22a. Another O-ring 60 is seated upon each arm 22 and 22a adjacent the inner race of each bearing ring 30 and 30a opposite the O-ring 56. The O-rings 56 and 60 cooperate to prevent the escape of fluid from the chambers 44 to the bearings 30 and 30a and from the bearings 30 and 30a out of the assembled device.

In the operation of the device as a motor, either the manifold 40 or 40a may be used as the input manifold into which a fluid under pressure is introduced. In the following, the fluid introduced will be deemed to be an incompressible hydraulic liquid, as for example, oil. The rotation of the rotor 24 will be clockwise if 40 is the input manifold and counterclockwise if 40a is the input manifold when the device is viewed as in FIGURE 2.

Assuming that the manifold 40a is the input manifold, the hydraulic fluid flows radially outwardly to the periphery of the stator 20 through the several passages 38a. Since the passages 38 and 38a in any one quadrant of the stator are disposed 72 degrees apart, and since the chambers 44 extend throughout 72 degrees of arc, it is not possible for the fluid to flow freely counterclockwise between the channels 38 and 38a. In the absence of rotation of the rotor, the hydraulic fluid must flow in a clockwise direction across the channels 36 and valves 46 adjactnt the passages 38a to gain access to the passages 38. When hydraulic fluid is first introduced into the manifold 40a, there is nothing preventing this flow and the hydraulic fluid will flow in a clockwise direction, as viewed in FIGURE 2, to the passages 38, creating a flow of hydraulic fluid without any production of power.

The initial flow of hydraulic fluid around the valves 46 creates regions of high flow velocity and therefore low hydrostatic pressure between the valves 46 and the surface of the rotor 24 and between the valves 46 and the extreme clockwise margins of the channels 36. The result is that the individual valves 46 will flow with the and the extreme clockwise margins of the channels 36 as viewed in FIGURE 2. When this contact is effected, flow of the hydraulic fluid in a clockwise direction is cut off and the pressure of the hydraulic fluid in the adjacent chambers 44 will rapidly rise.

Figure 4:
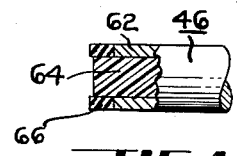
FIGURE 4 is an enlarged fragmentary view of a valve with a portion shown in section.

To prevent leakage of hydraulic fluid around the ends of the valves 46 with rising fluid pressure, a seal is provided at each end of each valve. FIGURE 4 illustrates a valve 46 in detail, the valve 46 including a tubular metallic member 62 filled with a light weight plastic core 64. The length of the core 64 is slightly less than the separation between the end plates 26 and 26a, and the length of the tubular member 62 is substantially less than that of the core, providing for elastomeric sleeves 66 which encircle the core 64 at each end of the tubular member 62. The arrangement is such that the sleeves 66 project slightly beyond the ends of the core 64 to engage the end plates 26 and 26a.

The end plates 26 and 26a are coated with a thin film of lubricant, which may be the hydraulic fluid itself, enabling the sleeves 66 to function as suction cups engaging the end plates 26 and 26a.

Figure 5:
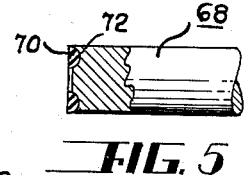
FIGURE 5 is a first modification of the valve of FIGURE 4.

FIGURE 5 shows a modified valve or abutment member 68, which may be a solid cylinder of a metal or plastic or the like, provided with an annular semi-cylindrical elastomeric ring seal 70 recessed in an annular groove 72 in each end thereof. The ring seals 70 function as small suction cups engaging the opposite end plates 26 and 26a.

Figure 6:
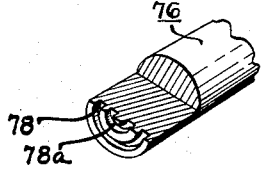
FIGURE 6 is a second modification of the valve of FIGURE 4.

Another modified valve or abutment 76 is illustrated in FIGURE 6. The valve 76 is a solid cylinder of a metal or a plastic or the like, provided with spaced concentric annular grooves 78 and 78a in each end thereof. The grooves 78 and 78a disrupt the flow of fluid across the ends of the valve when in close proximity to the end plates 26 and 26a. The turbulence thus created obstructs the flow of fluid around the valve.

A flow of hydraulic fluid between the stator 20 and the end plates 26 and 26a is prevented by maintaining tolerances sufficiently precise that the end plates 26 and 26a are spaced from the sides of the stator 20 by only a very small separation, whereupon an oil film between the stator and end plates will prevent the flow of fluid therebetween.

It can be shown mathematically, that when the valves 46 have been seated against the rotor 24 by the pressure of the hydraulic fluid, the fluid pressure exerted against the contoured wall of the rotor will develop a torque tending to drive the rotor in the counterclockwise direction, as viewed in FIGURE 2. As the rotor rotates, the chambers 44 are filled and emptied four times for each revolution of the rotor.

The magnitude of the torque in the absence of leakage and friction, is equal to: $L(\Delta P)(H_1 + H_2 + \ldots + H_n)$, where $H_n$ is the radial projection of each valve beyond the periphery of the stator 20, L is the axial length of the valves and the chambers 44, $\Delta P$ is the pressure differential between the fluid inlet and outlet passages 38 and 38a, and $n$ refers to the number of valves. Since there are four valves in the present illustration, $n$ takes the values of 1 to 4.

It can further be shown that where the number of chambers exceeds the number of valves by one, there being at least two valves, and where the chambers form a continuous sine curve, as illustrated in FIGURE 2, the sum of the valve projective heights, $H_1 + H_2 + \ldots + H_n$, is a constant for all angular orientations of the rotor relative to the stator. To simplify further discussions, it can be said that the constant quantity $H_1 + H_2 + \ldots + H_n$ is equal to $n$ H (ave.) where H (ave.) is the average projective height of each valve in transversing each chamber.

It is apparent that the device illustrated in FIGURE 2 produces a constant output torque, since the quantity $L(\Delta P) n$ H (ave.) is constant. Although a power converter device having five chambers and four valves is illustrated in FIGURE 2, a constant torque output is obtained irrespective of the number of valves and chambers employed, provided there are at least two valves and provided there is always just one more chamber than there are valves.

Employing $n$ to designate the number of valves and $n+1$ to designate the number of chambers in the hydraulic device of the type herein described, the central angle subtended by each chamber of the rotor is $360/(n+1)$ degrees. The device will be operative efficiently only if the spacing between the fluid passages 38 and 38$a$ between each pair of valves 46 is less than $360/(n+1)$ degrees of arc at the periphery of the stator. The spacing between adjacent valves of the stator is $360/n$ degrees of arc at the periphery of the stator. By subtraction, the maximum arc length between the passages 38 and 38$a$ on either side of each valve is $360/n (n+1)$ degrees of arc.

If, for the purposes of this calculation, we ignore the necessity for providing fluid passages 38 and 38$a$ of finite diameter, and a finite clearance for the valves 46 within the channels 36, it is apparent that an upper limit to the valve diameter is $2\pi R/n (n+1)$, this quantity being the length of arc between the fluid passages on either side of each valve 46 when the radius of the stator is R.

It has been emphasized hereinbefore that the radial depth of each chamber 44 must not exceed one-half the diameter of each valve 46. Therefore, the radial depth of each chamber in the hydraulic device of $n+1$ chambers must be less than $\pi R/n (n+1)$. This value is also the maximum value of $H_n$, the projective height of each valve and is proportional to the value of H (ave.), the average projective height of each valve.

It follows that the output torque of the device as described herein is proportional to the quantity $$L(\Delta P)\pi R/(n+1)$$

Clearly, the output torque increases with increasing stator radius; but decreases as the number of valves $(n)$ and chambers $(n+1)$ in the device increases. For a device of this type, of fixed dimensions, maximum output torque is obtained when just two valves and three chambers are employed.

This result follows from an observation that as the number of valves and chambers employed in the device increases, the diameter and therefore the available projective height of the valves necessarily decreases with a resultant reduction in output torque. This limitation can be avoided by employing a non-cylindrical pressure responsive valve, preferably a valve which can be as thin as desired without sacrificing projective height. Such a valve is shown at 80 in FIGURE 8.

The valve or abutment 80 is illustrated in association with a modified stator 90 which may be substituted directly for the stator 20 of the preferred embodiment. The substantially rectangular valve 80 is provided with one rounded end portion 82 adapted to engage the rotor 24 and an opposite bevelled end portion 84 adapted to engage the base of a rectangular channel 86 in which the valve 80 is slidably seated. A plurality of spaced fins 88 disposed within the channel 86 orient the valve 80 radially within the channel adjacent the extreme clockwise margin thereof.

Clearly, the radial length of the valve 80 is limited only by the depth of the channel 86, which, in turn, is limited only by the radius of the stator 90 carrying the valve. The valve will be seated properly by the fluid under pressure so long as the depth of the chambers 44 in the rotor 24 does not exceed one-half the radial length of the valve.

The tangential force seating the valve 80 against the clockwise wall of the channel 86 is $L(\Delta P)(D-H)$, where L is the axial length of the valve 80, $\Delta P$ is equal to the pressure on the counterclockwise side of the valve 80 less the pressure on the clockwise side of the valve 80, D is the total radial length of the valve 80, and H is the projective height of the valve 80 above the periphery of the stator. It is, of course, essential that the fluid be permitted to enter the channel 86 between the spaced fins 88.

The radial force with which the valve 80 is seated against the rotor 24 is substantially $\frac{1}{2}L(\Delta P)T$, where T is the thickness of the valve 80 and the factor $\frac{1}{2}$ appears as a result of rounding the end 82 of the valve 80. The portion 84 of the valve is bevelled to permit the fluid to apply this radial force, irrespective of the radial position of the valve 80 in the channel 86.

Figure 7:
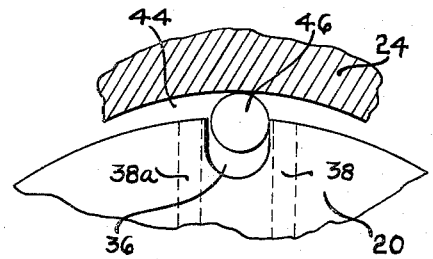
FIGURE 7 is an enlarged fragmentary view of a portion of FIGURE 2.

By comparison, the maximum tangential and radial forces seating the valve 46 against the chamber 44 as shown in enlarged detail in FIGURE 7, are both equal to $L(\Delta P)r$, where r is the radius of the valve 46.

Figure 8:
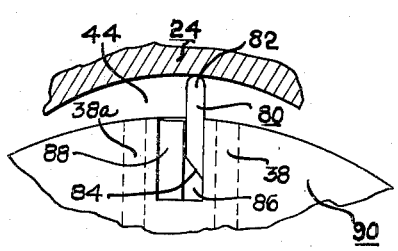
FIGURE 8 is a modification of the valve and valve channels shown in enlarged detail in FIGURE 7.

The valve arrangement shown in FIGURE 8, while permitting considerably greater output torques, imposes the limitation that the power converter device is no longer operable in either a clockwise or counterclockwise direction, the particular arrangement of FIGURE 8 being suitable for only a counterclockwise rotation of the rotor.

Figure 9:
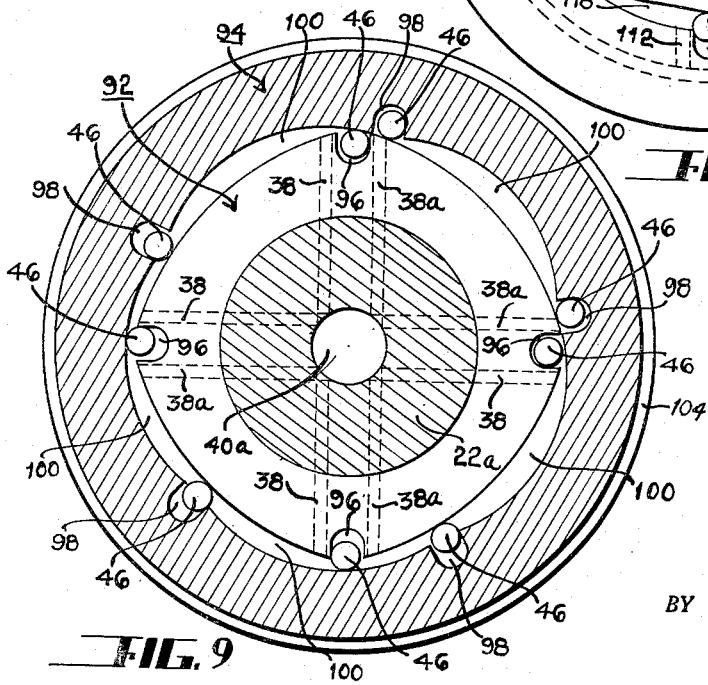
FIGURE 9 is a sectional view of a first modification of the power converter of FIGURES 1, 2 and 3.

Higher torques may also be obtained with the modified power converter device of FIGURE 9 in which cylindrical valves are employed in both the rotor and stator. This modification includes a stator 92 and a rotor 94 assembled into a fluid tight unit as described in connection with the preferred embodiment. The stator 92 is provided with four axial channels 96 analogous to the channels 36 of the preferred embodiment. The channels 96 divide the stator into four quadrants. The periphery of each quadrant of the stator 92 is cut on a radius greater than the maximum radius of the stator.

The stator 92 is further provided with passages 38 and 38$a$, valves or abutments 46, and manifolds 40 and 40$a$, the latter being disposed in fixedly mounted axial arms 22 and 22$a$, this arrangement being identical to that in the stator 20 of the preferred embodiment.

The annular rotor 94 is provided with five equally spaced internal axially extending channels 98 and five chambers 100 each cut on a radius smaller than the minimum radius of the rotor, the latter being substantially equal to the maximum radius of the stator. The construction of the rotor and stator is such that a very thin cylindrical zone of clearance exists between the two members enabling either member to rotate without touching the other. The side walls of the channels in the rotor and stator terminate at positions substantially contiguous with this zone of clearance while the surface portions of the rotor and stator intermediate the channels therein are recessed away from said zone of clearance. Cylindrical valves or abutments 46 are disposed in each of the channels 98 of the rotor.

If, in the modification of FIGURE 9, a fluid is introduced under pressure in the manifold 40$a$ communicating with the passages 38$a$ of the stator, the valves 46 disposed in the stator will be drawn into engagement with the rotor 94 at the extreme clockwise margin of the channels 96 by the flow process described hereinbefore. By an analogous flow process, the valves 46 in the rotor will be drawn into engagement with the periphery of the stator at the extreme counterclockwise margins of the channels 98. The rotor 94 will then be driven in a counterclockwise direction, with rising fluid pressure. In practice, the seating of the valves 46 in response to fluid pressure in the manifold 40$a$ is extremely rapid, the valves seating in a fraction of a second.

It is apparent from the arrangement of parts that as the rotor moves counterclockwise, the curved surfaces of the rotor and stator of FIGURE 9 operate as cams driving the valves 46 into their respective channels as the valves associated with the rotor cross over the valves associated with the stator. As soon as the cross over of valves occurs, a slight leakage of fluid over the valves immediately reseats the valves. It is further apparent that the modification of FIGURE 9 may be operated in either a clockwise or counterclockwise direction.

The output torque of the modification when used as a motor is a complicated function due to the variable chamber depth and to the resistance created by the camming action of the rotor and stator surfaces. As an approximation the average output torque is less than: $L(\Delta P)(H_1+H_2+ \ldots +H_n+K_1+K_2+ \ldots +K_n)$ and greater than $L(\Delta P)(H_1+H_2+ \ldots H_n)$, where $H_n$ is the projective height of the valves associated with the stator beyond the zone of clearance between the rotor and stator, and $K_n$ is the projective height of the valves associated with the rotor beyond the aforementioned zone of clearance.

Although the output torque of the modification of FIGURE 9 is not constant, it will be greater than that of the preferred embodiment for a device equivalent in physical size, but necessarily less than twice that of the preferred embodiment. By irregularly shaping the rotor and stator surfaces, the output torque can be adjusted to approach very nearly a constant value.

There are several advantages immediately apparent in the modification of FIGURE 9. For example, there is no direct contact between the curved surfaces of the rotor and stator so that machining tolerances are less exacting than required for the preferred embodiment. Similarly, since all curved surfaces are segments of a cylinder, machining of the curved surfaces is simplified.

Since the rotor surfaces do not contact the stator surfaces, it is possible to confine wear to the valves alone by making the valve surfaces less hard than the rotor and stator surfaces. Considerable wear can be tolerated in the valves without loss in operating efficiency and, of course, it is materially more economical to replace the valves rather than the rotor or stator in reconditioning the device.

In the preferred embodiment of FIGURES 1, 2 and 3 and the modification of FIGURE 9, a device operable as a motor has been described. By mechanical rotation of the rotor, the device becomes a fluid pump, although it is not self-priming. Once fluid has been introduced into the rotor chambers, as by operation of the device momentarily as a motor, mechanical rotation of the rotor produces a turbulent fluid flow over the valves of the device, seating the valves, whereupon the device operates as a pump.

A ring gear 102 shown in FIGURES 1, 2, and 3, encircles the rotor 24 of the preferred embodiment for the purposes of transmitting mechanical power to and from the rotor. The rotor 94 of the modification of FIGURE 9 is provided with a belt engaging surface 104 for the purposes of transmitting or receiving mechanical power. Many other means of transmitting power may be employed and, further, it may be that the rotor itself is a work producing element, such as a grinding wheel or a circular cutting blade.

For some applications, it may be desirable to rotate the inner member of the power converter device and fixedly mount the outer member. With the embodiments of FIGURES 2 and 9, the stator element can be rotated and the rotor element can be fixedly mounted provided suitable couplings are provided on the arms of the element 20 or 92 through which the fluid can be supplied continuously as the "stator" arms rotate.

Figure 10:
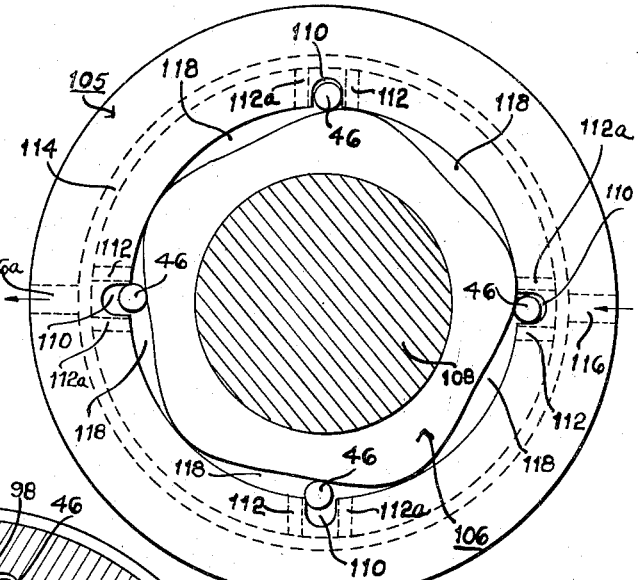
FIGURE 10 is a sectional view of a second modification of the power converter shown in FIGURES 1, 2 and 3.

A second modification, shown in FIGURE 10, eliminates the need for such special couplings, the couplings being undesirable, in that they tend to create a leakage problem. The modification of FIGURE 10 includes an outer annular stator 105 and an inner substantially cylindrical rotor 106 provided with axially extending arms 108. The rotor and stator are shaped and assembled in a manner analogous to the assembly of the devices of FIGURES 2 and 9, the stator being fixedly mounted upon a suitable support.

The inner surface of the stator 105, which is substantially cylindrical in shape, is divided into four quadrants by four equally spaced axially extending channels 110 housing suitable cylindrical valves or abutments 46. Adjacent each channel 110, on the counterclockwise side thereof as viewed in FIGURE 10 are a plurality of axially aligned passages 112 extending outwardly and obliquely into the stator 105 to communicate with an annular manifold 114 disposed in the annular body of the stator. The manifold 114 communicates outside the stator by means of a port 116.

Similarly, on the clockwise side of each channel 110, are a plurality of axially aligned passages 112a communicating with a separate annular manifold, not shown, communicating in turn with a port 116a. A fluid may flow into the device through the port 116 and out of the device through the port 116a or may flow in the reverse direction.

The periphery of the rotor 106 is provided with a continuous sine or cosine curve surface, the maxima of which engage in line contact the cylindrical inner surface of the stator, there being five maxima creating five chambers 118 between the rotor 106 and the stator 105.

When a fluid under pressure is suplied to the device of FIGURE 10, the rotor 106 will rotate with constant torque in a manner analogous to the operation of the preferred embodiment of FIGURE 2. The modification of FIGURE 10 may be used as a motor or pump, operating in either a clockwise or counterclockwise direction. The same limitations as to maximum output torque exist in the second modification as existed in the preferred embodiment. These limitations may be overcome by the use of valves 80 as illustrated in FIGURE 8.

In a similar manner, the rotor and stator of the modification of FIGURE 9 may be inverted to provide an analogous device with a rotating inner member and a stationary outer member.

In the operation of the present power converting device, it is apparent that if the rotor is initially driven to high speeds by fluid power means, then cut off from the fluid pressure, the rotor will continue to rotate under its own momentum coupled with the momentum of any driven apparatus, the device operating as a pump. If the device is in series with a fluid pump in a closed circuit, the device will attempt to drive the pump as a motor.

A typical illustration of this effect is in the application of the present device to a bicycle, wherein the rotor of the device is the rear wheel of the bicycle and a separate piston type hydraulic pump is operated by the pedals. If the pump and rear wheel motor are connected in series in a closed hydraulic fluid circuit, it will be impossible for the bicycle to coast unless the pump and pedals are also driven by the hydraulic motor located in the rear wheel. It is, of course, objectionable to allow the pedals to be driven by the rear wheel while the bicycle is coasting. A simple means of eliminating this effect is to provide a by-pass valve between the inlet and outlet manifolds of the present device. Such a valve, with a suitable control element is illustrated in FIGURE 11.

Figure 11:
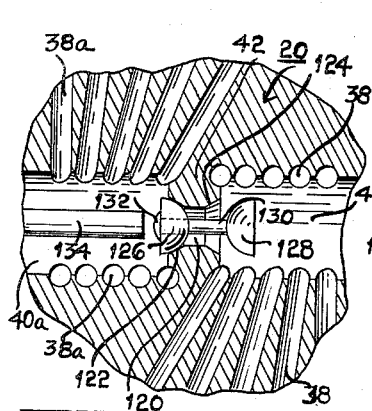
FIGURE 11 is a fragmentary sectional view illustrating a free wheeling control valve.

FIGURE 11 is an enlarged detail view of the manifolds 40 and 40a of either the preferred embodiment of FIGURE 2 or the modification of FIGURE 9. A passage 120 has been placed in the disc element 42, the passage 120 connecting the manifolds 40 and 40a. The ends of the passage 120 are flared outwardly to provide valve seats 122 and 124. Freely mounted adjacent the passage 120 are two hemispherical valve elements 126 and 128 adapted to seat in the valve seats 122 and 124, respectively. A connecting shaft 130, integral with the valve element 128, is secured to the valve element 126 by means of a suitable headed pin 132, the valve elements 126 and 128 being thereby secured in fixed spaced relation to one another. Clearly, when the fluid pressure in the manifold 40a rises above that in the manifold 40, the valve element 126 will be seated to close the passage 120 and when the pressure differential is reversed, the valve element 126 will open and the valve element 128 will close, once again closing the passage 120.

A control rod 134 is provided in the manifold 40a for limiting the movement of the valve elements 126 and 128 so as to prevent closure of the passage 120 by the valve element 128, the rod 134 engaging the head of the pin 132 in the valve element 126 as the fluid pressure in the manifold 40 rises.

With this arrangement, the power converter device is "free wheeling" when the manifold 40a is the fluid inlet manifold and the manifold 40 is the fluid outlet manifold. Further, the device will experience a fixed braking force when "coasting," determined by the resistance to fluid flow in the passage 120 and the passages 38 and 38a.

By providing means, not shown, for manually adjusting the control rod 134, the braking force may be adjusted as desired. If a second manually adjustable control rod is provided in the manifold 40, the device can be made "free wheeling" in either direction of rotation, and braked at will, regardless of the direction of rotation of the rotor.

In the adaptation of the device for pneumatic purposes, it is advisable to use extremely light weight valves, which may be plastic of a small diameter the rotor chambers being very small in radial depth to provide for a minimum valve displacement.

Although the preferred embodiment and various modifications of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A fluid power converter comprising a substantially cylindrical stator member and a substantially tubular rotor member concentrically mounted for rotation on said stator member, the maximum radius of said stator member being slightly less than the minimum radius of the inner periphery of said rotor member, said stator member having a plurality of equi-spaced axially extending channels in its outer periphery opening at the maximum radius thereof and dividing said periphery into a plurality of peripheral sectors, the peripheral sectors between adjacent channels each having a radius of curvature greater than the maximum radius of said stator member, said rotor member having a plurality of equi-spaced axially extending channels in its inner periphery opening at the minimum radius thereof, said channels being disposed in opposing relation to the channels of said stator, there being one more channel in said rotor member than in said stator member, the channels of said rotor member dividing the inner periphery thereof into a plurality of sectors, the sectors between adjacent channels of said rotor member each having a radius of curvature less than the minimum radius of the inner periphery of said rotor member, the sectors of said rotor and stator members cooperating to provide a plurality of axially extending chambers between said rotor and stator members, a plurality of radially extending fluid inlet passages in said stator member, there being one passage disposed to one side of each channel therein, a plurality of radially extending fluid outlet passages in said stator member, there being one passage disposed to the other side of each channel therein, the central angle between fluid inlet and fluid outlet passages between adjacent channels in said stator member being not less than the central angle between adjacent channels in said rotor member, a pair of end plates, there being one end plate secured to each end of said rotor member engaging the ends of said stator member so as to provide a fluid tight closure for said chambers, and a plurality of elongate abutments, there being one said abutment seated loosely in each said channel, each said abutment making a substantially fluid tight engagement with said end plates, said abutments moving in response to fluid flow between said fluid inlet passages and said fluid outlet passages into engagement with the opposing surfaces of said chambers so as to isolate said inlet passages from said outlet passages.

2. A fluid power converter according to claim 1 wherein said abutments each comprise an elongate element of substantially rectangular cross-section having an arcuate side adapted to engage the opposing chamber surface.

3. A fluid power converter according to claim 1 wherein said abutments each comprise an elongate cylindrical element.

4. A fluid power converter comprising a rotor member and a stator member, one of said members being journalled within the other, the members being concentrically mounted and rotatable one with respect to the other, the inner of said members having a maximum outer radius less than the minimum inner radius of the outer of said members, said members having opposing contoured peripheries cooperating to provide an annular space therebetween, said contoured peripheries each comprising a plurality of equi-spaced axially extending channels and intermediate surfaces, there being more channels in the rotor member than in the stator member, the channels of said outer member opening to the inner periphery thereof at its minimum radius, the channels of said inner member opening to the outer periphery thereof at its maximum radius, the intermediate surfaces of said outer member receding into the body thereof to a radius greater than the minimum radius of its inner periphery, the intermediate surfaces of said inner member receding into the body thereof to a radius less than the maximum radius of its outer periphery, a plurality of abutments, there being one abutment mounted for sliding movement in each said channel, and means providing a plurality of fluid inlets and outlets to said annular space, there being one fluid inlet in said stator adjacent one side of each channel therein, and one fluid outlet in said stator adjacent the other side of each channel therein, the fluid inlet and outlet located between each pair of adjacent channels in the stator defining a central angle no less than the central angle between adjacent channels in the rotor.

5. The fluid power converter according to claim 4 wherein said abutments are axially extending cylindrical elements seated within said channels, said cylindrical elements each having a diameter less than the width of its corresponding channel.

6. In a fluid power converter, the combination comprising a hollow outer member and an inner member mounted within said outer member for relative rotation about a fixed axis, said members having opposed peripheries encircling said axis and defining an annular space therebetween, each said periphery including a plurality of spaced axially extending channels and intermediate surface portions, the channels of said inner member opening to said annular space at positions equi-distant from said axis with the intermediate surface portions of said inner member occupying positions closer to said axis, the channels of said outer member also opening to said annular space at positions equi-distant from said axis with the intermediate surface portions of said outer member occupying positions farther from said axis, a plurality of elongate abutments, there being one abutment disposed within each said channel, said abutments being freely movable radially in said channels between positions recessed therein and positions engaging the opposing surface portions of said members, one of said members having more channels and abutments than the other member, said other member having a plurality of fluid inlets and outlets therein, there being one fluid inlet positioned to one side of each channel of said other member and one fluid outlet positioned to the other side of each channel of said other member, the fluid inlet and outlet located between each pair of adjacent channels of said other member defining a central angle no less than the central angle between adjacent channels in said one member.

7. A fluid power converter of the type having a pair of relatively movable members separated by a fluid chamber, at least one of said members supporting abutments which are biased into the fluid chamber to react with the fluid therein, said power converter comprising a pair of members mounted for rotation one with respect to the other about a common axis, said members having opposing surfaces separated by a thin zone of clearance whereby said surfaces may move one past the other without touching upon relative movement of said members, means engaging the sides of said members and cooperating with said surfaces to establish a closed fluid cavity between said members, each of the opposing surfaces having a plurality of substantially equally spaced channels therein, said channels extending transverse to the direction of relative movement such that the channels in one surface cross successively over the channels in the other surface upon relative movement of said members, the separation between adjacent channels in one member exceeding the separation between adjacent channels in the other member, the side walls of the channels in each surface terminating at positions contiguous with said zone of clearance, portions of each surface intermediate said channels being recessed away from said zone of clearance, a plurality of elongate abutments, there being one abutment disposed in each said channel, said abutments being adapted to move outwardly of their respective channels through said zone of clearance to engage the opposing surface and thereby partition said cavity, said abutments each following the contour of the opposing surface so as to cross one over the other on relative movement of said members, and means providing a plurality of fluid inlet and outlet passages in said one member, there being one fluid inlet passage opening to the surface of said one member on one side of each channel therein and one fluid outlet passage opening to the surface of said one member on the other side of each channel therein, the fluid inlet and outlet located between each pair of channels in said one member having a separation no less than the separation between adjacent channels in said other member.

8. The fluid power converter according to claim 7 wherein a clearance is provided between the side walls of each channel and the abutment therein to provide a passage for movement of fluid in said channel and behind the abutment therein.

9. The fluid power converter according to claim 7 wherein said abutments are elongate cylindrical members, each having a diameter less than the distance between the side walls of the channels, there being clearance between said abutments and said side walls enabling movement of fluid into said channels and behind the abutment therein.

10. A fluid power converter comprising, in combination, a hollow outer member having a substantially cylindrical cavity therein, an inner substantially cylindrical member disposed concentrically within said cavity, said inner and outer members being mounted for rotation one with respect to the other about a common axis, the maximum radius of said inner member being slightly less than the minimum radius of the cavity in said outer member, said inner member having a plurality of equi-spaced axially extending channels in its outer periphery opening at the maximum radius thereof and dividing said periphery into a plurality of peripheral sectors, the peripheral sectors between adjacent channels each having a radius of curvature greater than the maximum radius of said inner member, said outer member having a plurality of equi-spaced axially extending channels in the inner periphery thereof opening to said cavity at the minimum radius thereof, said channels being disposed in opposing relation to the channels of said inner member, the channels of said outer member dividing the inner periphery thereof into a plurality of sectors, the sectors between adjacent channels of said outer member each having a radius of curvature less than the minimum radius of said cavity, the sectors of the inner and outer members cooperating to provide a plurality of axially extending chambers between said inner and outer said members, there being more channels in one of said members than in the other member, said other member having a plurality of fluid inlet and outlet passages, there being one inlet passage disposed to one side of each channel of said other member and one outlet passage disposed to the other side of each channel of said other member, the central angle between fluid inlet and outlet passages in each sector of said other member being no less than the central angle between adjacent channels in said one member, end plates engaging the opposite ends of said members to provide a closure for said chambers, and a plurality of elongate abutments, there being one abutment seated loosely in each said channel, each abutment making a substantially fluid tight engagement with said end plates, said abutments moving in response to fluid flow between said fluid inlet and outlet passages into engagement with the opposing surfaces of said chambers so as to isolate said inlet passages from said outlet passages.

References Cited in the file of this patent

UNITED STATES PATENTS

| | | |
|---|---|---|
| 150,788 | Prosser et al. | May 12, 1874 |
| 807,421 | Dickison | Dec. 12, 1905 |
| 855,590 | Ripberger | June 4, 1907 |
| 929,018 | Ripberger | July 27, 1909 |
| 1,271,585 | Klise | July 9, 1918 |
| 1,280,601 | Weidenbach | Oct. 1, 1918 |
| 1,424,977 | Bidwell | Aug. 8, 1922 |
| 1,471,761 | Weidenbach | Oct. 23, 1923 |
| 1,965,388 | Ott | July 3, 1934 |
| 1,997,184 | Rueman | Apr. 9, 1935 |
| 2,035,465 | Erskine | Mar. 31, 1936 |
| 2,091,752 | Davis | Apr. 31, 1937 |
| 2,191,172 | Lisowski | Feb. 20, 1940 |
| 2,440,593 | Miller | Apr. 27, 1948 |
| 2,545,238 | MacMillin et al. | Mar. 13, 1951 |
| 2,631,544 | Wilcox | Mar. 17, 1953 |
| 2,645,902 | Pyle | July 21, 1953 |
| 2,660,123 | Vlachos | Nov. 24, 1953 |
| 2,725,013 | Vlachos | Nov. 29, 1955 |
| 2,730,076 | Hogue | Jan. 10, 1956 |
| 2,818,025 | Hein | Dec. 31, 1957 |
| 2,845,872 | Farron et al. | Aug. 6, 1958 |

FOREIGN PATENTS

| | | |
|---|---|---|
| 66,066 | Denmark | Dec. 1, 1947 |
| 433,488 | Great Britain | Aug. 15, 1935 |
| 1,117,494 | France | Feb. 27, 1956 |